E. P. CURTIS.
HAY TEDDER.
APPLICATION FILED JAN. 13, 1909.

952,238.

Patented Mar. 15, 1910.

Witnesses
R. D. Tolman
Penelope Cumberbach

Inventor
Edwin P. Curtis.
By Rufus B. Fowler
Attorney

UNITED STATES PATENT OFFICE.

EDWIN P. CURTIS, OF WORCESTER, MASSACHUSETTS, ASSIGNOR TO RICHARDSON MANUFACTURING COMPANY, OF WORCESTER, MASSACHUSETTS, A CORPORATION OF MASSACHUSETTS.

HAY-TEDDER.

952,238.  Specification of Letters Patent.  Patented Mar. 15, 1910.

Application filed January 13, 1909. Serial No. 472,033.

*To all whom it may concern:*

Be it known that I, EDWIN P. CURTIS, a citizen of the United States, residing at Worcester, in the county of Worcester and Commonwealth of Massachusetts, have invented a new and useful Improvement in Hay-Tedders, of which the following is a specification, accompanied by drawings, forming a part of the same, in which—

Figure 1:
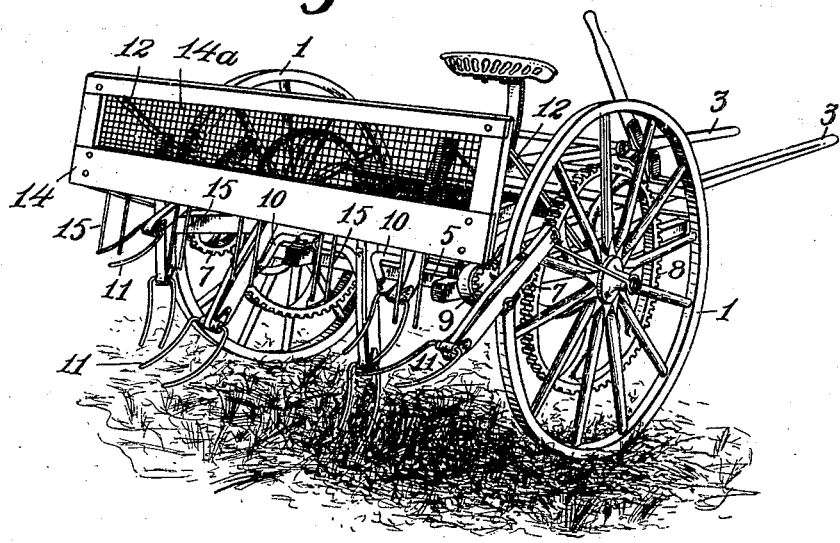
Figure 2:
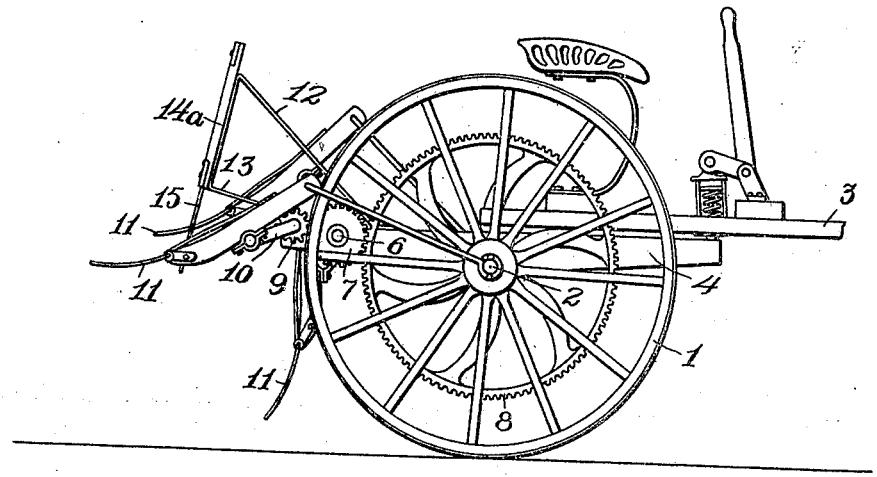

Figure 1 is a perspective view of my improved hay tedder, and Fig. 2 is a side view of the same.

Similar reference figures refer to similar parts in the different views.

My invention relates to hay tedders for lifting and spreading hay, and comprises means for preventing the hay from being tossed or blown into the operative parts of the tedder while the hay is in the air, and it consists in the construction and arrangement of parts as hereinafter described and pointed out in the annexed claims.

Referring to the accompanying drawings, the tedder is provided with wheels 1 connected by an axle 2, upon which is supported the tilting frame and to which are attached the shaft 3. The tilting frame comprises side pieces 4 connected by cross bars 5. In the rear ends of each side piece 4 are studs 6 on which are journaled pinions 7, which mesh with gear wheels 8 attached to the rotating supporting wheels 1. The pinions 7 are also in mesh with pinions 9, mounted on the outer ends of crank shafts 10, 10, journaled in the tilting frame, which operates the forks 11.

The above described construction of a hay tedder is well known and forms no part of my present invention.

Mounted on the rear end of the tilting frame by supporting rods 12 and 13 is a shield 14, arranged to protect the running parts from the hay in the air at the back of the machine during the operation of the tedder. The supporting rods hold the shield 14 preferably slightly inclined from the vertical, and at a sufficient distance from the tilting frame not to interfere with the movement of the forks. The shield 14 is preferably constructed of a rectangular frame inclosing a panel 14ª of any desired size or variety of mesh of wire, which allows air to pass but is sufficient to prevent the passage of hay or other material thrown up by the forks, and which would otherwise be blown forward upon the tedder.

The screen is arranged to stop such material, yet offer no obstacle to the passage of the wind. In the operation of the ordinary hay tedder, a considerable quantity of hay and other material thrown into the air by the forks will lodge in the various rotating parts of the tedder, especially when a strong wind is blowing in the same direction as the tedder is moving, thereby interfering with their easy operation, which my shield is designed to prevent. The shield is also provided with downwardly extending rods 15, which are designed to remove hay which has become entangled with the forks 11, thereby keeping the forks in the best condition for lifting and scattering the hay.

The shield is extended upwardly to bring its top above the highest point reached by the upper ends of the fork bars in the operation of the machine, and the shield is preferably slightly inclined from the vertical, as shown in Fig. 2, so as to fully protect the rotating crank shaft about which the hay is liable to become entangled in the operation of the machine. In the position of the shield as described, no place is afforded for the lodgment of hay upon the shield, and any hay which may pass over the top of the shield will be carried forward of the crank shaft and fall to the ground between the open framework of the machine.

The downwardly projecting rods 15 form a series of tines, which extend into the path of the forks 11 as the latter are brought upwardly and forwardly, and serve as strippers for removing any hay which might be carried by the forks forward over the bearings of the crank shaft.

The use of wire cloth for covering the panel 14ª is a convenient method of construction, as it effectually prevents the passage of hay and, at the same time, provides for the free movement of air through the meshes of the wire cloth. The same result might be accomplished, however, by extending bars across the open panel.

In the use of a hay tedder without a shield and with a strong wind blowing, it is often impossible to operate the machine when moving in the same direction the wind is blowing, owing to the large mass of hay thrown into the air by the action of the forks, which is carried forward and allowed to lodge upon the crank shaft, and any cover over the top of the crank shaft, in order to prevent the latter from being entangled with hay, is objectionable, as it provides a lodging place for the hay.

The use of the perforated panel lessens the resistance to the wind when the tedder is moving against the wind and, when the tedder is moving in the direction of the wind, any hay which is carried over the top of the shield is prevented from falling immediately in front of the shield by the wind blowing through the perforated panel, thereby allowing the shield to be maintained in substantially a vertical position.

I claim,

1. A hay tedder having a rotating shaft at the rear of said tedder, a series of forks arranged to be actuated by the rotation of said shaft, and an upright shield mounted at the rear of said rotating shaft but above and in front of said forks during their upward movement.

2. The combination with a hay tedder, comprising forks and a rotating shaft for actuating said forks, of a shield attached to the tedder and held in the path of the hay from said forks to said rotating shaft, and means attached to said shield for removing hay from said forks.

3. A hay tedder having a rotating shaft at the rear of said tedder, a series of forks at the rear of said shaft, means connecting said forks with said shaft arranged to raise and lower said forks by the rotation of said shaft, and means above said forks at the rear of said rotating shaft arranged to prevent the passage of hay thrown up by said forks onto said rotating shaft.

4. A hay tedder comprising forks and a rotating shaft for actuating said forks, and a shield supported from said tedder in the path of hay thrown up by said forks onto said rotating shaft.

5. A hay tedder comprising a rotating shaft and forks actuated by said shaft, arranged to deposit hay outside and at the rear of said shaft, and an upright shield at the rear of said shaft and in front of the path of the hay deposited by said forks.

6. A hay tedder comprising a rotating shaft, forks actuated by said shaft and extending rearwardly therefrom, and an upright shield supported by said tedder at the rear of said shaft and arranged to prevent the passage of hay thrown up by said forks onto said rotating shaft, said shield also arranged to permit the passage of air through said shield, whereby hay in front of said shield may be carried beyond said rotating shaft.

EDWIN P. CURTIS.

Witnesses:
PENELOPE COMBERBACH,
RUFUS B. FOWLER.